(12) United States Patent
Suryadevara et al.

(10) Patent No.: US 12,000,215 B2
(45) Date of Patent: Jun. 4, 2024

(54) DRILLING STRING, THREADED COUPLING, AND ROD ADAPTOR FOR ROTARY DRILLING

(71) Applicants: SANDVIK MINING AND CONSTRUCTION G.M.B.H., Zeltweg (AT); SANDVIK MINING AND CONSTRUCTION AUSTRALIA PTY LTD, Brisbane (AU); SANDVIK MINING AND CONSTRUCTION AUSTRALIA (PRODUCTION SUPPLY) PTY LTD, Brisbane (AU)

(72) Inventors: Manoj Kumar Suryadevara, Zeltweg (AT); Todd Bonniface, Salamander Bay (AU); John Barry, Merewether HTS (AU)

(73) Assignees: Sandvik Mining and Construction G.m.b.H., Zelteg (AT); Sandvik Mining and Construction Australia Pty Ltd, Milton (AU); Sandvik Mining and Construction Australia (Production/Supply) Pty Ltd, Milton (AU)

( * ) Notice: Subject to any disclaimer, the term of this patent is extended or adjusted under 35 U.S.C. 154(b) by 373 days.

(21) Appl. No.: 17/299,103

(22) PCT Filed: Nov. 6, 2019

(86) PCT No.: PCT/EP2019/080306
§ 371 (c)(1),
(2) Date: Jun. 2, 2021

(87) PCT Pub. No.: WO2020/114699
PCT Pub. Date: Jun. 11, 2020

(65) Prior Publication Data
US 2022/0074273 A1 Mar. 10, 2022

(51) Int. Cl.
*E21B 17/042* (2006.01)
*E21B 3/00* (2006.01)
*F16L 15/06* (2006.01)

(52) U.S. Cl.
CPC .............. *E21B 17/042* (2013.01); *E21B 3/00* (2013.01); *F16L 15/06* (2013.01)

(58) Field of Classification Search
CPC ...... E21B 17/042; E21B 3/00; E21B 17/0426; F16L 15/06
See application file for complete search history.

(56) References Cited

U.S. PATENT DOCUMENTS 1,904,675 A * 4/1933 Boyer ..................... F16L 15/06
285/133.4
3,876,319 A * 4/1975 Meyer ................. E21B 17/0426
403/343

(Continued)

FOREIGN PATENT DOCUMENTS

| CN | 107683363 A | 2/2018 |
| EP | 0187628 A2 | 7/1986 |

(Continued)

*Primary Examiner* — David Bochna
(74) *Attorney, Agent, or Firm* — Corinne R. Gorski (57) ABSTRACT

A drill string for rotary drilling of underground mining machines includes a first elongate drill string member and a second elongate drill string member. The first member has a main section and a male end, and the second member has a main section and a female end. The male and female ends each have respective threads to provide a thread coupling between the male and female ends, the thread coupling enabling the male end to be secured inside the female end such that the male and female ends overlap axially. A thread lead of the respective threads of the male and the female ends are greater than a diameter of the male end and the female end.

13 Claims, 9 Drawing Sheets

SECTION A-A'

(56) References Cited

U.S. PATENT DOCUMENTS

| | | | | |
|---|---|---|---|---|
| 4,084,829 A * | 4/1978 | Falchle | ............... | E21B 17/0426 |
| | | | | 173/104 |
| 4,332,502 A * | 6/1982 | Wormald | ............ | E21B 17/0426 |
| | | | | 403/343 |
| 4,625,814 A | 12/1986 | Helasuo et al. | | |
| 4,861,209 A | 8/1989 | Larsson | | |
| 6,196,598 B1 * | 3/2001 | Yao | ..................... | E21B 17/0426 |
| | | | | 285/333 |
| 6,810,956 B1 * | 11/2004 | Sandstrom | ............ | E21B 17/042 |
| | | | | 175/323 |
| 2002/0074797 A1 * | 6/2002 | Liljebrand | .......... | E21B 17/0426 |
| | | | | 285/333 |
| 2004/0050592 A1 * | 3/2004 | Carlstrom | ........... | E21B 17/0426 |
| | | | | 175/320 |
| 2010/0123311 A1 * | 5/2010 | Church | ................. | E21B 17/042 |
| | | | | 403/334 |
| 2010/0140929 A1 * | 6/2010 | Nava | ....................... | F16L 15/06 |
| | | | | 285/333 |

FOREIGN PATENT DOCUMENTS

| | | | |
|---|---|---|---|
| EP | 2845993 A | | 3/2015 |
| GB | 1111995 A | | 5/1968 |
| GB | 1564473 A | | 4/1980 |
| WO | 2004003334 A1 | | 1/2004 |

\* cited by examiner

SECTION A-A'

SECTION B-B'

DRILLING STRING, THREADED COUPLING, AND ROD ADAPTOR FOR ROTARY DRILLING

RELATED APPLICATION DATA

This application is a § 371 National Stage Application of PCT International Application No. PCT/EP2019/080306 filed Nov. 6, 2019 claiming priority to EP 18209699.0 filed Dec. 3, 2018.

FIELD OF INVENTION

The present invention relates to an extension drilling system for rotary drilling of underground mining machines, and, although not exclusively, to an extension drilling system having a plurality of extension rods constituting a drill rod string that has cooperating male and female threaded couplings therebetween.

BACKGROUND

When drilling long holes into the land surface or rock stratum, extension rods are connected in succession by screw thread ends. In rotary drilling, the extension rods in succession are connected to a rotary drill driving device to transfer the thrust and torsion to the drill bit on the other end of the extension rods. During drilling, the screw threads are subject to torque and shock loading from the thrust of rotary drilling, and the stress generated therefrom results in the threads of the extension rod being screwed even tighter, such that the screw threads cannot be readily disconnected.

In this situation, the solution to solve the above problem is usually to strike the extension rods manually after boring the hole, that is, when the extension rods are not driven for drilling. This will uncouple the screw threads to a certain extent.

In practice, this is dangerous to the operator and damaging to the extension rods.

To provide a proper thread coupling of extension rods, to improve the drilling efficiency, the helix angle and/or flank angle are adjusted to increase the anti-jamming performance of threaded coupling, for instance, to increase the strength and resistance to jamming and cross-threading. Examples of drill strings and threaded ends of drill strings for percussive drilling are described in U.S. Pat. Nos. 4,861,209 A and 4,625,814 A.

However, drill strings or extension rods with improved helix angle or flank angle are applied in percussive drilling, and not in rotary drilling. Moreover, conventional drill strings are disadvantageous for several reasons. Generally, there is a desire to increase the tightening capacity of a thread, where the tightening capacity is defined as the ratio between the uncoupling torque and the tightening torque. If the uncoupling torque on the threads is increased to raise the tightening capacity, it would result in difficulties in disconnection of drill strings. Additionally, although in some cases lead angle is increased in a certain way, the increased amount of degrees is usually quite limited, which will further limit the performance of the drill string. Accordingly, what is required is a drill string for rotary drilling that addresses the above problems.

SUMMARY

It is an objective of the present invention to minimise the uncoupling torque of the threaded coupling between a male threaded end and a female threaded end to provide an easy to disconnect drill string. It is a further objective to use multi-start rope thread in the field of rotary drilling to largely increase the lead angle of the rope thread by increasing the lead of the threads.

The objective is achieved by providing a drill string, a rod adaptor and a threaded coupling for connecting drill string members, or for connecting the drill string to the rod adaptor, in which male and female coupling parts are arranged specifically to minimise the uncoupling torque of the drill string.

According to a first aspect of the present invention, there is provided a drill string for rotary drilling of underground mining machines, comprising: a first elongate drill string member having a main section and a male end; a second elongate drill string member having a main section and a female end; the male and female ends having respective threads to provide a thread coupling between the male and female ends, the thread coupling enables the male end to be secured inside the female end such that the male and female ends overlap axially; wherein a thread lead of the respective threads of the male end and the female end is greater than a diameter of the male end and the female end.

Within the specification, reference to 'threads' refers to a helical ridge and groove extending axially along a length portion of the male and female end.

Optionally, the respective threads of the male end and the female end are multi-start threads. This configuration increases the thread lead, to increase the lead angle of the threads of the male and female ends. Optionally, the respective threads of the male end and the female end are double-start threads.

Within the specification, reference to 'single-start thread' refers to a thread having one axially extending helical ridge, i.e., there is one ridge wrapped around the cylinder of the thread's body, and each time that the thread's body rotates one turn (360°), it has advanced axially by the width of one ridge. And reference to 'multi-start thread' refers to a thread having a plurality of axially extending helical ridges, i.e., there are multiple ridges wrapped around the cylinder of the thread's body, and each time that the thread's body rotates one turn (360°), it has advanced axially by the width of that multiple ridges. By way of example, "double-start" means that there are two ridges wrapped around the cylinder of the screw's body. Each time that the screw's body rotates one turn (360°), it has advanced axially by the width of two ridges. Normally, when the other parameters of the thread are certain, comparing double-start thread and single-start thread, the thread lead of a double-start thread is greater than that of a single-start thread, and the lead angle is thus increased in a double-start thread. In the same manner, the thread lead and the lead angle of a triple-start thread is generally greater than a double-start or single-start thread.

Within the specification, reference to 'thread lead' refers to the distance along the thread's axis that is covered by one complete rotation (360°) of the thread, or to put it in another way, refers to an axial length between two corresponding points on a thread. The thread lead of a single-start thread refers to the axial length between two corresponding points on the helical ridge, which is the width of one ridge, and it is the same for double-start and multi-start threads, where the thread lead equals to the width of two or multiple ridges, respectively. Generally, the thread lead of a double-start thread would be double the axial length between the two points on two adjacent ridges, and the thread lead if it is a triple-start thread would be triple such axial length. Reference to 'lead angle' refers to an angle between the helical ridge of a thread and a plane perpendicular to the axis of the thread. The lead angle reflects a level of inclination of the threads, to be specific, a level of helical ridge inclination of the threads.

Optionally, the threads are right-handed threads. And optionally, the respective threads of the male end and the female end are rope threads or trapezoidal threads.

Within the specification, reference to 'right-handed threads' refers to threads that when seen from a point of view on the axis through the centre of the helix, moves away from the viewer when it is turned in a clockwise direction, and moves towards the viewer when it is turned counter clockwise. Reference to 'rope thread' or 'trapezoidal thread' refers to a thread profile. The thread profile of a rope thread is partially circular, such that the thread profile of the grooves or ridges of the rope thread is part of a circle, which means that the thread profile has rope geometries. In the same manner, the thread profile of a trapezoidal thread is trapezoidal.

Optionally, the thread coupling between the male end and the female end can be uncoupled by hand, since the uncoupling torque is minimised, and the coupling is easy to disconnect.

Optionally, the respective threads of the male end and the female end have a diameter of 16 mm and are triple-start. The diameter of the male and female ends is defined as the transverse distance between two ridges of the male and female ends respectively. Given that the diameter of the threads is 16 mm, optionally, the lead angle of the threads of the male end and the female end is greater than 20°. This configuration decreases the uncoupling torque of the threads, and thus the drill string is easy to disconnect with such an increased lead angle.

Optionally, the respective threads of the male end and the female end have a diameter of 20 mm and are-double start. The diameter of the male and female ends is defined as the transverse distance between two ridges of the male and female ends respectively. Given that the diameter of the threads is 20 mm, optionally, the lead angle of the threads of the male end and the female end is greater than 22°. This configuration decreases the uncoupling torque of the threads, and thus the drill string is easy to disconnect with such an increased lead angle.

Optionally, the respective threads of the male end and the female end have a diameter of 25 mm and are double-start. And optionally, the lead angle of the threads of the male end and the female end is greater than 17° given the diameter of the threads being 25 mm. This configuration decreases the uncoupling torque of the threads, and thus the drill string is easy to disconnect with such an increased lead angle.

Optionally, the underground mining machine that uses the drill string is a bolting machine or bolter miner.

According to a second aspect of the present invention there is provided a threaded coupling for connecting drill string members to form a drill string, the threaded coupling comprising: a male end having a first axial length; a hollow female end having a second axial length; the male and female ends having respective threads to enable the male end to be secured inside the female end such that at least a part of the first axial length of the male end and a part of the second axial length of the female end overlap axially to form a coupling; wherein a thread lead of the respective threads of the male end and the female end is greater than a diameter of the male end and the female end.

Optionally, the respective threads of the male end and the female end are multi-start threads. This configuration increases the thread lead, so as to increase the lead angle of the threads of the male and female ends. Optionally, the respective threads of the male end and the female end are double-start threads.

Optionally, the threads are right-handed threads.

According to a third aspect of the present invention there is provided a rod adaptor for a rotary drilling machine, comprising: a first end; a second end positioned towards a drill string of the drilling machine, wherein the second end and a corresponding end of the drill string have respective threads to enable the second end to be secured to the corresponding end of the drill string; an elongate body extending between the first end and the second end; wherein the threads of the second end have a thread lead that is greater than a diameter of the second end thread.

Optionally, the respective threads of the male end and the female end are multi-start threads. This configuration increases the thread lead, so as to increase the lead angle of the threads of the male and female ends. Optionally, the respective threads of the male end and the female end are double-start threads.

Optionally, the threads are right-handed threads.

Optionally, the rod adaptor is a drive adaptor. The first end of the drive adaptor is positioned towards a drive system of the drilling machine, so that the drive system transmits power to the drive adaptor, and further to the drill string. The drive adaptor is connected between a drive unit of the drilling machine and the drill string, the second end of the drive adaptor can be a male threaded end to be secured inside a female threaded end of the first drill rod on the drill string; or the second end of the drive adaptor can be a female threaded end to be secured outside a male threaded end of the first drill rod on the drill string. In this way, the drive unit transmits power to the drive adaptor and further to the drill string through the threaded coupling of the second end and the drill string.

Optionally, the rod adaptor is a bit adaptor. The first end of the bit adaptor is positioned towards a drill bit of the drilling machine, so that power transmitted to the bit adaptor is further transmitted to the drill bit for drilling. The bit adaptor is connected between a drill bit of the drilling machine and the drill string. The second end of the bit adaptor can be a male threaded end to be secured inside a female threaded end of the last drill rod on the drill string; or the second end of the bit adaptor can be a female threaded end to be secured outside a male threaded end of the last drill rod on the drill string. In this way, the power transmitted from the drive unit to the drill string, is further transmitted to the drill bit through the threaded coupling between the drill bit and the drill string.

Optionally, the threads of the second end have a diameter of 20 mm, and a lead angle of the threads can be greater than 22°. This configuration decreases the uncoupling torque of the threads, and thus the rod adaptor is easy to disconnect from the drill string.

BRIEF DESCRIPTION OF DRAWINGS

A specific implementation of the present invention will now be described, by way of example only, and with reference to the accompanying drawings in which.

DETAILED DESCRIPTION

Figure 1A:
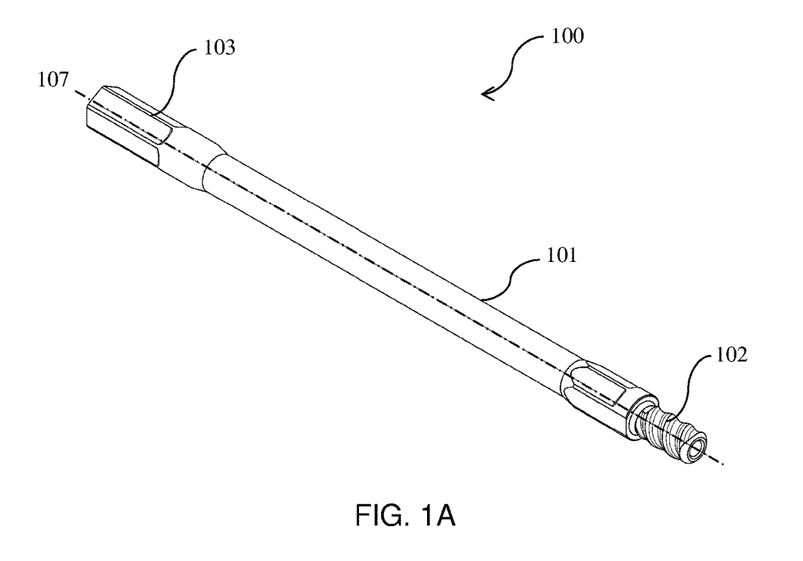
FIG. 1A is a perspective view of a drill rod according to a specific implementation of the present invention.

FIG. 1A is a perspective view of a drill rod 100 according to a specific implementation of the present invention. Referring to FIG. 1A, the drill rod 100, which can be used in a bolting machine or bolter miner, includes an elongate rod body 101, a first end 102, and a second end 103. An outside diameter of the elongate rod body 101 increases at each end 102, 103 to form a radially flared end coupling region respectively. The first end 102 is a male end with external threads, and the second end 103 is a female end with internal threads. The male threaded end 102 of the drill rod 100 is cooperative with a female threaded end of a next extension rod, and the female threaded end 103 of the drill rod 100 is cooperative with a male threaded end of a previous extension rod, to provide thread couplings between the extension rods. The thread coupling enables the male end to be secured inside the female end such that the male end and the female end overlap axially. A plurality of drill rods 100 engaging with one another forms an elongate drill string, where one end of the drill string is connected to a drill bit that is drilling into a land surface or rock stratum, and the other end of the drill string is connected to a drive unit that drives the drilling.

Figure 1B:
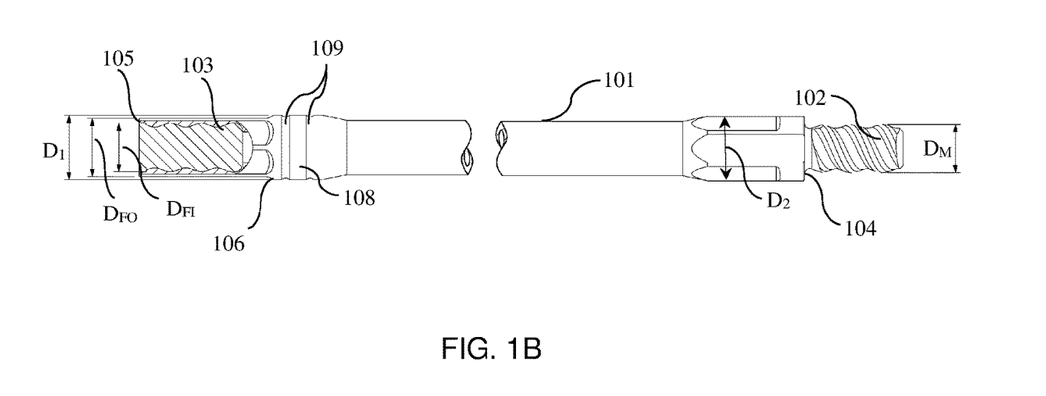
FIG. 1B is a planar view of the drill rod of FIG. 1A, with a cross sectional view of the female end, according to a specific implementation of the present invention.

FIG. 1B is a planar view of the drill rod 100 of FIG. 1A, with a cross sectional view of the female end 103, according to a specific implementation of the present invention. The major diameter $D_M$ of the male end 102 is approximately the same as the major diameter $D_{FI}$ of the female end 103. An outer diameter $D_{FO}$ of the female end 103 is equal to or slightly larger than an outer diameter of the rod body 101. The rod body 101, and the male and female ends 102, 103 are aligned axially. In the axial direction 107 towards the rod body 101, a shoulder 104 is configured in a region adjacent the male end 102, and an outermost surface 105 of the female end 103 substantially perpendicular to the axle 107 of the drill rod 100 rests against the shoulder 104 when the male and female ends are coupled together in a connection. In the axial direction 107 towards the rod body 101, a tapering shoulder 106 is configured in a region adjacent the female end 103, which creates an expanded region 108 between the rod body 101 and the female end 103, the outer diameter $D_1$ of the expanded region 108 can be equal to the radially outermost diameter $D_2$ of the shoulder 104.

In one embodiment of the present invention, the thread lead of the respective threads of the male end 102 and the female end 103 is greater than the major diameter $D_M/D_{FI}$ of the male end 102 and the female end 103. Preferably in this embodiment, the male and female threads are multi-start threads, more specifically, the threads of the male end 102 and the female end 103 can be double-start threads or triple-start threads. Advantageously, such configuration minimises the uncoupling torque of the threaded coupling between the male and female ends, and thus the male and female ends can be easily disconnected, e.g., by hand. By way of example, the male end 102 and the female end 103 are double-start threads, and the thread lead, which is double the pitch of the threads, is configured to be greater than the major diameter $D_M/D_{FI}$ of the male end and the female ends 102, 103. By way of another example, the male end 102 and the female end 103 are triple-start threads, and the thread lead, which is triple the pitch of the threads, is configured to be greater than the major diameter $D_M/D_{FI}$ of the male end and the female ends 102, 103.

In one embodiment, the double-start threads are right-handed threads. In another embodiment, the respective threads of the male and female ends are rope threads or trapezoidal threads. By way of example, the threads can be symmetrical threads having rope geometries. In one embodiment, the male end 102 and the female end 103 have double-start rope threads, where given the major diameter of the male thread being 20 mm, the lead angle of the double-start thread can be greater than 22°, advantageously, the uncoupling torque of the threaded coupling is minimised. In another embodiment, the major diameter $D_M$ of the male end 102 and the major diameter $D_{FI}$ of the female end 103 is 25 mm, and accordingly the lead angle of the threads can be greater than 17°, which also largely decreases the uncoupling torque of the threads.

In other embodiments of the present invention, the major diameter $D_M$ of the double starts threads may be in a range e.g., between 18-25 mm. If the thread lead $L_2$ is configured to be $L_2$=25.4 mm, greater than the major diameter $D_M/D_{FI}$ as aforementioned, the lead angle β can be calculated from the below formula:

$$\tan β = L_2/\pi D_M$$

Based on the formula, by configuring the male and female threads as double-start threads as illustrated in the embodiments of the present invention, the lead angle β can be calculated as:

$\tan β = L_2/\pi D_M$ where the major diameter $D_M$=17.7 mm and $L_2$=25.4 mm.
β=24.6°

$\tan β = L_2/\pi D_M$ where the major diameter $D_M$=19.7 mm and $L_2$=25.4 mm.
β=22.3°

$\tan β = L_2/\pi D_M$ where the major diameter $D_M$=21.7 mm and $L_2$=25.4 mm.
β=20.4°

$\tan β = L_2/\pi D_M$ where the major diameter $D_M$=24.7 mm and $L_2$=25.4 mm.
β=18.1°

Advantageously, the uncoupling torque of the double-start threads coupling can be minimised given that the lead angle β can be configured to be in a range as illustrated above.

Also, based on the above formula, by configuring the male and female threads as triple-start threads as illustrated above, the lead angle β can be calculated as:

tan $\beta = L_2/\pi D_M$ where the major diameter $D_M$=15.7 mm and $L_2$=19.05 mm.

$\beta$=21.1°

Advantageously, the uncoupling torque of the triple-start threads coupling can be minimised.

The value of major diameters and lead angles are illustrated as embodiments and are not for limitation of the present invention. A person skilled in the art would understand that other embodiments with different values of major diameters and lead angles can be applied.

Throughout the specification, a double-start rope thread is described as an embodiment of this invention, and it is described for illustrative purpose only, for the person skilled in the art, it will be understood that multiple starts, e.g., a triple start thread is also within the spirit of the present invention, and thus e.g., triple-start rope thread can be used in the present invention for the purpose of decreasing the uncoupling torque of the coupling region of the drill rod.

Referring to FIG. 1B again, the drill rod 100 includes a groove 109 located on or around the expanded region 108. In one embodiment, there are two grooves 109 recessed from the external surface of the expanded region 108 and circled around the expanded region 108 in a vertical direction. The groove(s) 109 is configured for identifying the drill rod 100 of the present invention with minimised uncoupling torque, from other drill rods with similar appearances.

Figure 2A:
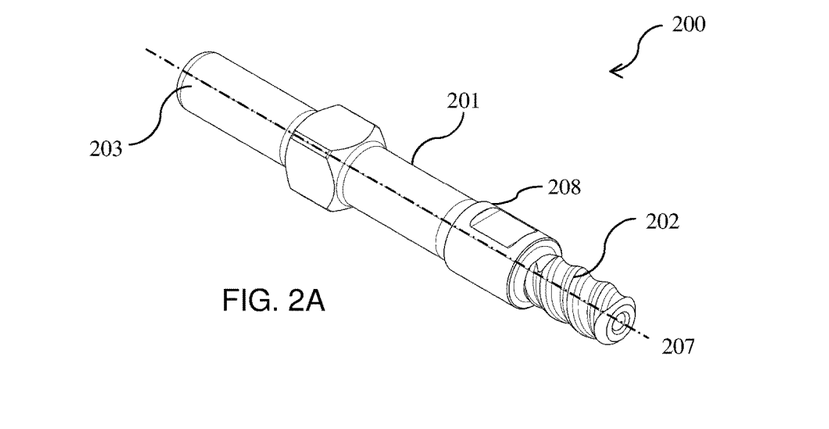
FIG. 2A is a perspective view of a drive adaptor according to a specific implementation of the present invention.
Figure 2B:
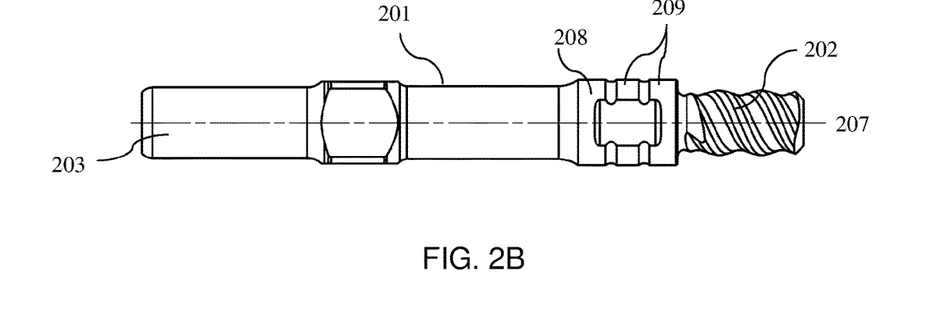
FIG. 2B is a planar view of the drive adaptor of FIG. 2A according to a specific implementation of the present invention.
Figure 2C:
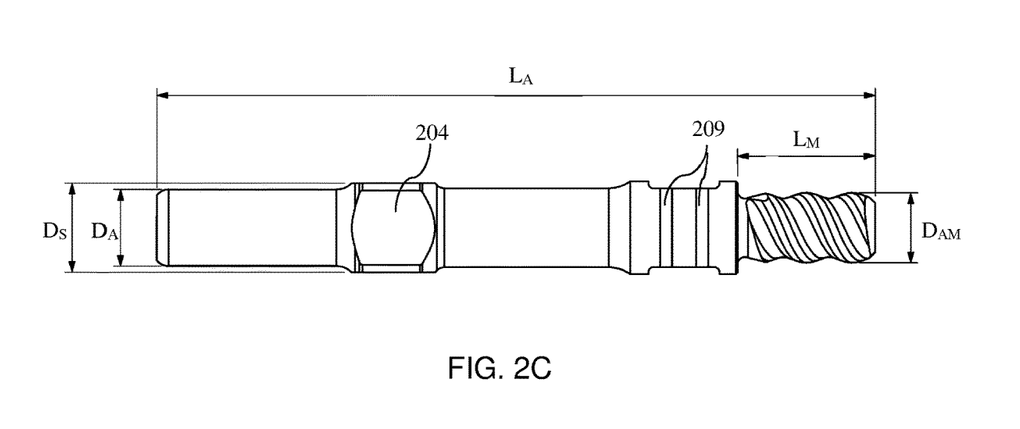
FIG. 2C is another planar view of the drive adaptor of FIG. 2A according to a specific implementation of the present invention.

FIGS. 2A to 2C illustrate a drive adaptor 200 configured to be coupled between a drive unit and a drill rod 100 as shown in FIGS. 1A-1B. The drive adaptor 200 includes a main section 201, a male threaded end 202 connected to a first drill rod 100, and an end 203 connected to the drive unit to transmit power from the drive unit to the drill rod 100. The male threaded end 202 is configured with similar shape to the male end 102 of the drill rod 100, and thus is configured to be complementary in shape to the female end 103 of the drill rod 100. When the drive adaptor 200 is connected to a drill string including the first drill rod 100, the male threaded end 202 is coupled to the female threaded end 103 of the first drill rod 100, to secure the drive adaptor 200 to the drill string. The axis 207 of the drive adaptor 200 coincides with the axis 107 of the drill rod 100 when the drive adaptor 200 is secured. In one embodiment, the male end 202 of the drive adaptor 200 has a thread lead that is greater than a diameter $D_M$ of the male end 202. The threads of the male end 202 can be multi-start threads, and in one specific embodiment, the male end 202 has double-start threads. Advantageously, the usage of double-start threads in the threaded coupling in rotary drilling machines, minimises the uncoupling torque of the threaded coupling, and thus the drive adaptor 200 and the drill string can be easily disconnected, e.g., by hand. In one embodiment, the double-start threads are right-handed threads.

Referring to FIG. 2C, an annular shoulder 204 projects radially from a middle region of the main section 201, such that a diameter $D_S$ of an outer surface of the shoulder 204 is greater than a diameter $D_A$ of the main section 201. And the diameter $D_A$ of the main section 201 is preferably greater than the outer diameter $D_{AM}$ of the male threaded end 202. By way of example, the male end 202 has an outer diameter $D_{AM}$ of 20 mm, while the projecting shoulder 204 has a diameter $D_S$ of 25 mm and the main section 201 has a diameter $D_A$ of 22 mm. In one embodiment, the total length $L_A$ of the drive adaptor can be 200 mm.

By way of example, the male end 202 has double-start rope threads, where given the major diameter of the male thread being 20 mm, the lead angle of the double-start thread can be greater than 22°, thus the uncoupling torque of the threaded coupling is minimised. By way of another example, if the major diameter $D_M$ of the male end 102 is 25 mm, the lead angle of the male threads can be greater than 17°, which also largely decreases the uncoupling torque of the threads.

Referring to FIGS. 2B-2C again, the drive adaptor 200 includes a groove 209 located axially around an expanded region 208 adjacent the male end 202. In one embodiment, there are two grooves 209 recessed from the external surface of the expanded region 108 and circled around the expanded region 108 in a vertical direction to the axle 207 of the drive adaptor 200. The groove(s) 209 is configured for identifying the drive adaptor 200 of the present invention with minimised uncoupling torque, from other drive adaptors with similar appearances. The drive adaptor 200 shown in FIG. 2C is the same drive adaptor 200 as shown in FIG. 2B when rotated axially by 90° to 270°.

Figure 3A:
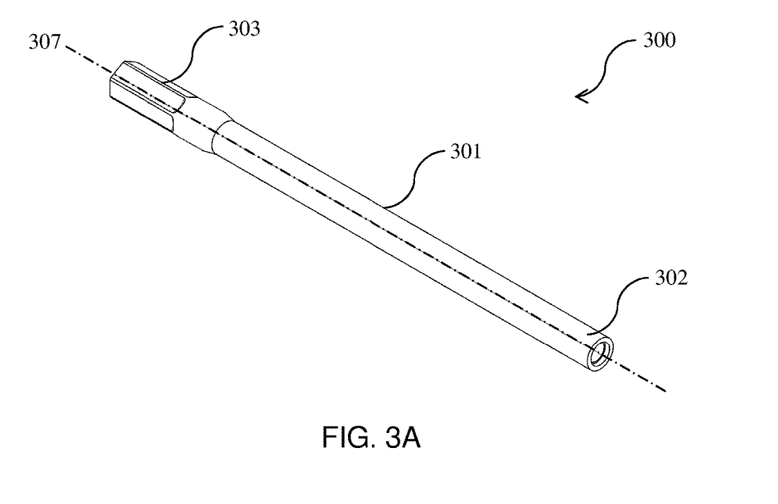
FIG. 3A is a perspective view of a bit adaptor according to a specific implementation of the present invention.
Figure 3B:
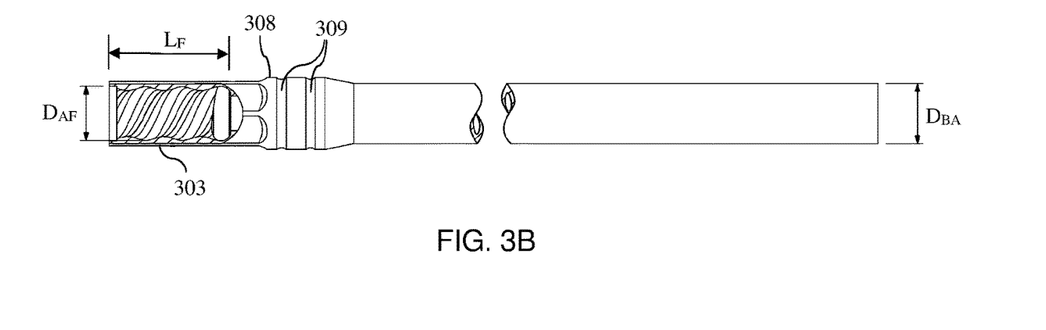
FIG. 3B is a planar view of the bit adaptor of FIG. 3A, with a cross sectional view of the threaded end, according to a specific implementation of the present invention.

FIGS. 3A to 3B illustrate a bit adaptor 300 configured to be coupled between a drill bit and a drill string of a rotary drilling machine. The bit adaptor 300 includes a main section 301, a female threaded end 303 connected to the last drill rod 100 of the drill string, and an end 302 connected to the drill bit to transmit power from the drill string to the drill bit for drilling into the land surface or rock stratum. The female threaded end 303 is configured with similar shape to the female end 103 of the drill rod 100, and thus is configured to be complementary in shape to the male end 102 of the drill rod 100. When the bit adaptor 300 is connected to the drill string including the last drill rod 100, the female threaded end 303 is coupled to a male threaded end 102 of the last drill rod 100, to secure the bit adaptor 300 to the drill string. The axis 307 of the bit adaptor 300 coincides with the axis 107 of the drill rod 100 when the bit adaptor 300 is secured. In one embodiment, the female end 203 of the bit adaptor 300 has a thread lead that is greater than a diameter $D_{FI}$ of the female end 203. And in one embodiment, the threads of the female end 203 are multi-start threads, and, the female end 203 has double-start rope threads. Advantageously, the usage of double-start threads in the threaded coupling in rotary drilling machines, minimises the uncoupling torque of the threaded coupling, and thus the bit adaptor 300 and the drill string can be easily disconnected, e.g., by hand. In one embodiment of this present invention, the double-start threads are right-handed rope threads, while in a conventional design, the bit adaptor has left-handed threads which are rope threads or trapezoidal threads.

Referring to FIG. 3B, a planar view of the bit adaptor 300 with a cross sectional view of the threaded end 303 is shown. In the embodiment of FIG. 3B, the inner diameter $D_{AF}$ of the female threaded end 303 is 20 mm, and the outer diameter $D_{BA}$ of the main section 301 is 22 mm. By way of example, the lead angle of the double-start female thread 303 is greater than 22° given the major diameter $D_{AF}$ of the female threaded end 303 equals to 20 mm, and in one embodiment, thus the uncoupling torque of the threaded coupling is minimised. By way of another example, if the major diameter $D_{AF}$ of the female end 303 is 25 mm, the lead angle of the female threads is accordingly greater than 17°, which also largely decreases the uncoupling torque of the threads.

Referring to FIG. 3B, the bit adaptor 300 includes a groove 309 located axially around an expanded region 308 adjacent the female end 303. In one embodiment, there are two grooves 309 recessed from the external surface of the expanded region 308 and circled around the expanded region 308 in a vertical direction to the axle 307 of the bit adaptor 300. The groove(s) 309 is configured for identifying the bit adaptor 300 of the present invention with minimised uncoupling torque, from other bit adaptors with similar appearances.

The male end 202 in FIGS. 2A-2C, and the male end 102 in FIGS. 1A-1B, each has an axial length $L_M$. The female end 303 in FIGS. 3A-3B, and the female end 103 in FIGS. 1A-1B, each has an axial length $L_F$. The internal threads of the female end 103; 303, and the external threads of the male end 102; 202 form a threaded coupling to enable the male end 102; 202 to be secured inside the female end 103; 303 such that at least a part of the axial length $L_M$ of the male end 102; 202 and a part of the axial length of the female end 103 overlap axially. In an embodiment of the present invention, the axial length $L_M$ is 38 mm, and the axial length $L_F$ is the same with the axial length $L_M$, such that the axial length of the male end 102; 202 and female end 103; 303 overlaps with each other.

Figure 4A:
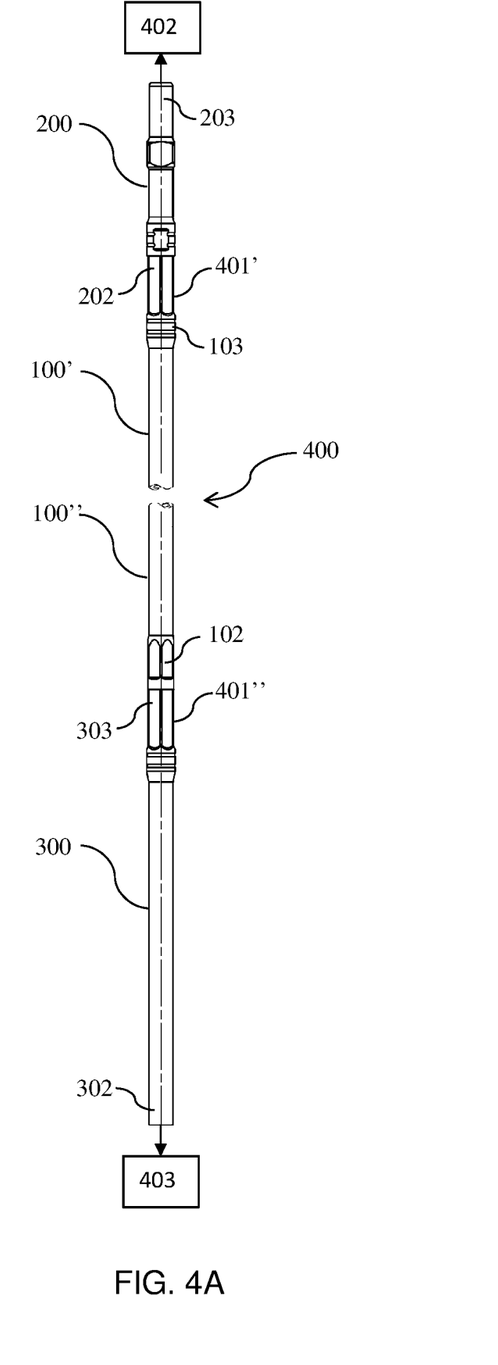
FIG. 4A is a planar view of the drive adaptor in FIGS. 2A-2B and the bit adaptor in FIGS. 3A-3B connected to a drill string according to a specific implementation of the present invention.
Figure 4B:
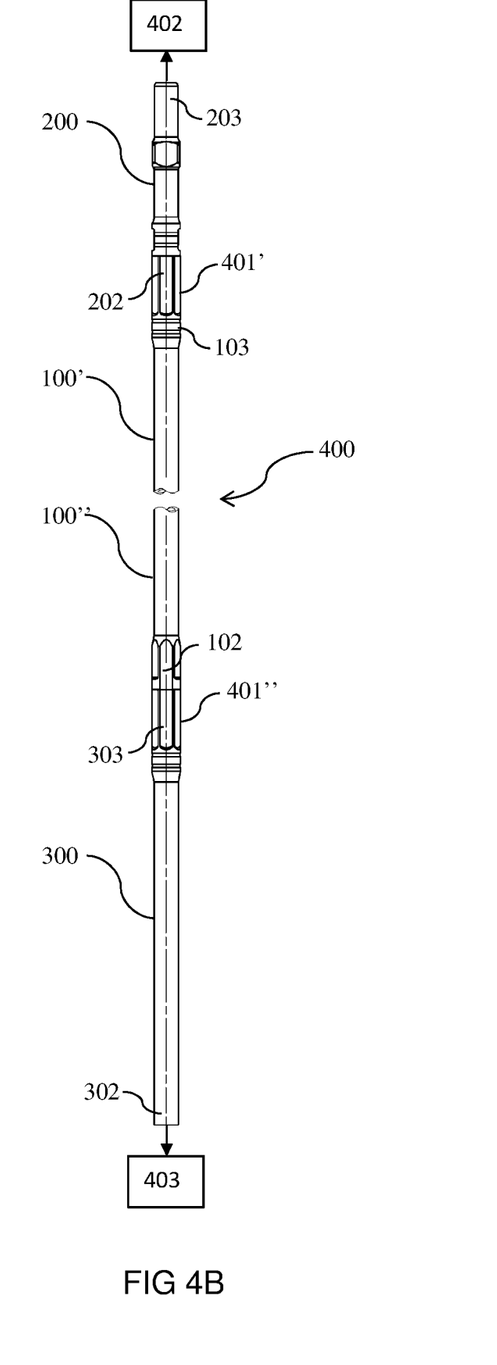
FIG. 4B is another planar view of the drive adaptor in FIGS. 2A-2B and the bit adaptor in FIGS. 3A-3B connected to a drill string according to a specific implementation of the present invention.

FIG. 4A is a planar view of the drive adaptor 200 in FIGS. 2A-2B and the bit adaptor 300 in FIGS. 3A-3B connected to a drill string 400 according to a specific implementation of the present invention. FIG. 4B is another planar view of the drive adaptor 200 in FIGS. 2A-2B and the bit adaptor 300 in FIGS. 3A-3B connected to a drill string 400 according to a specific implementation of the present invention. The drill string 400 shown in FIG. 4B is the same drill string 400 as shown in FIG. 4A when rotated axially by 90° to 270°. In the embodiment of FIGS. 4A-4B, the drill string 400 includes at least a first drill rod 100' and a last drill rod 100". The first and second drill rods 100' and 100" are embodiments of the drill rod 100 shown in FIG. 1A-1B. The first drill rod 100' is connected to a drive system 402 in one end and is further connected to the drive adaptor 200 via a threaded coupling 401', and the last drill rod 100" is connected to a drill bit 403 in one end and is further connected to the bit adaptor 300 via the threaded coupling 401". The threaded couplings 401' and 401" are formed by securing a male threaded end to a female threaded end, and the threaded couplings 401' and 401" is a section where an axial length of the male end overlaps with an axial length of the female end. In the embodiments of the present invention, a thread lead of the respective threads of the male and female threaded ends is greater than a diameter $D_M/D_{FI}$ of the male and female threaded ends, as a result, the threaded couplings 401' and 401" have a minimised uncoupling torque, so that the drill string and the drive/bit adaptor can be easily disconnected, e.g., by hand.

Figure 5A:
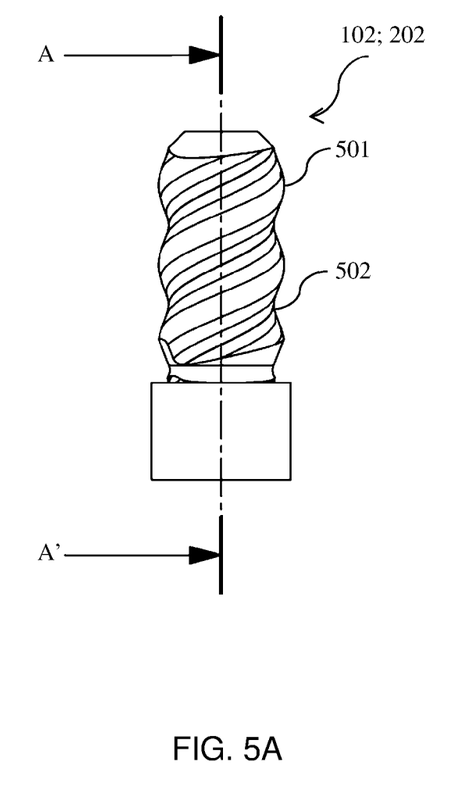
FIG. 5A is a planar view of a male thread of FIG. 1A-1B, FIG. 2A-2B.

FIG. 5A illustrates a planar view of the male threads 102; 202 of FIGS. 1A-1B, and FIGS. 2A-2B, and FIG. 5B illustrates a cross sectional view A-A' of the male threads 102; 202. FIG. 6A illustrate a planar view of the female threads 103; 303 of FIGS. 1A-1B, and FIGS. 3A-3B, and FIG. 6B illustrates a cross sectional view B-B' of the female threads 103; 303. Since the male thread and the female thread are complementary in shape, FIGS. 5A, 5B, 6A and 6B are described in combination. In one embodiment, the threads 102; 202 and the female threads 103; 303 are rope threads with at least two starts. Particularly, the rope thread has symmetrical threads having rope geometries, and the threads are right-handed threads in one embodiment. Multi-start thread has an increased thread lead compared with a single-start thread, by configuring the thread lead L2 to be greater than the major diameters $D_M$; $D_{FI}$ of the male threads 102; 202 and the female threads 103; 303, the uncoupling torque of the threaded couplings can be minimised. In one embodiment, the male and female threads are double-start rope threads. By way of example, referring to FIGS. 5A, 5B, 6A and 6B, the thread lead L1 of the male threads 102; 202 and the female threads 103; 303 is 12.7 mm, and the thread lead L2 of each start is 25.4 mm, which is greater than the major diameter 20 mm of the male and female threads. Thereby when the male threads 102; 202 and the female threads 103; 303 are in coupled connection, the uncoupling torque of a threaded couplings is reduced. Moreover, in this embodiment, given the major diameter of the male and female threads equals to 20 mm, the lead angle β as shown in FIG. 6B is greater than 22°, a longitudinal height H1 of thread ridges 501; 601 and thread grooves 502; 602 is configured to be 1.55 mm. In one embodiment, the threads of the male end 102; 202 includes several ridges 501 that have a radius of 5.5 mm, and the threads of the female end 102; 202 includes several grooves 602 that have a radius of 6 mm. While in another embodiment, the threads of the male end 102; 202 includes several grooves 502 that have a radius of 6 mm, and the threads of the female end 103; 303 includes several ridges 601 that have a radius of 5.5 mm.

Figure 5B:
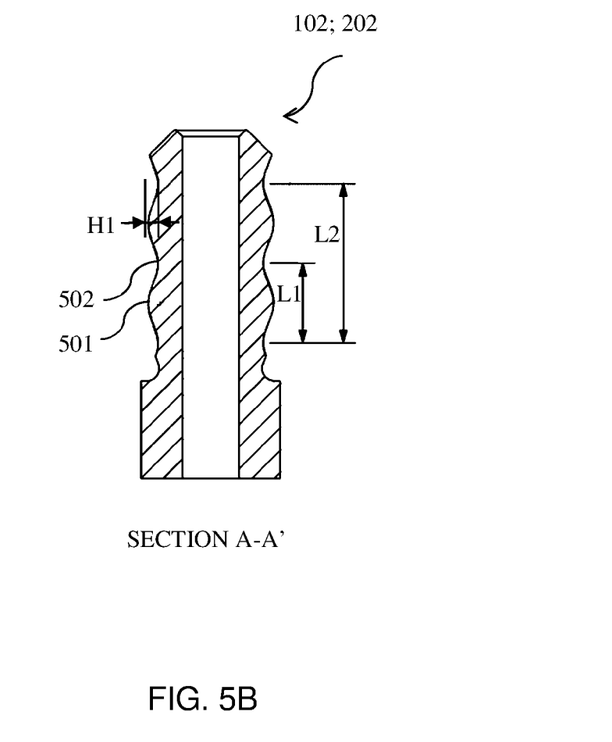
FIG. 5B is a cross sectional view A-A' of the male thread in FIG. 5A.
Figure 6A:
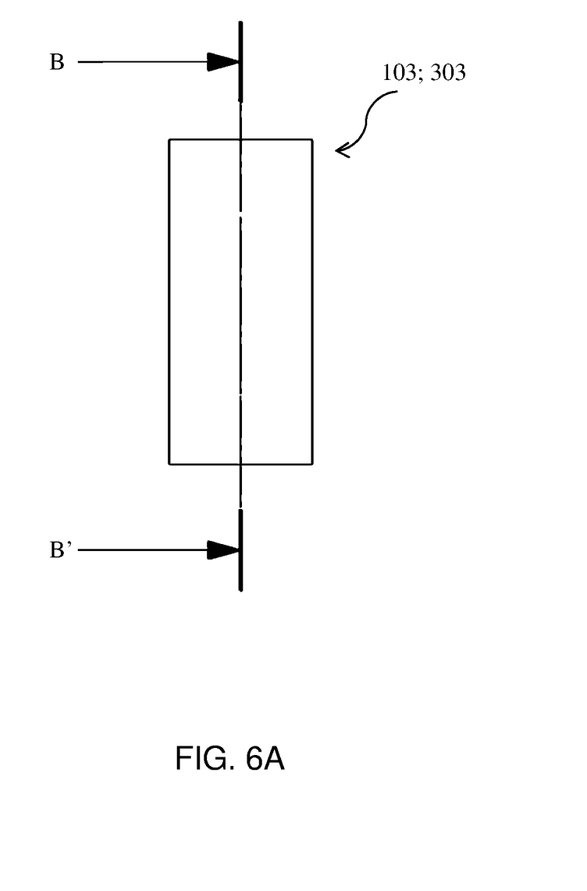
FIG. 6A is a planar view of a female thread of FIG. 1A-1B, FIG. 3A-3B.
Figure 6B:
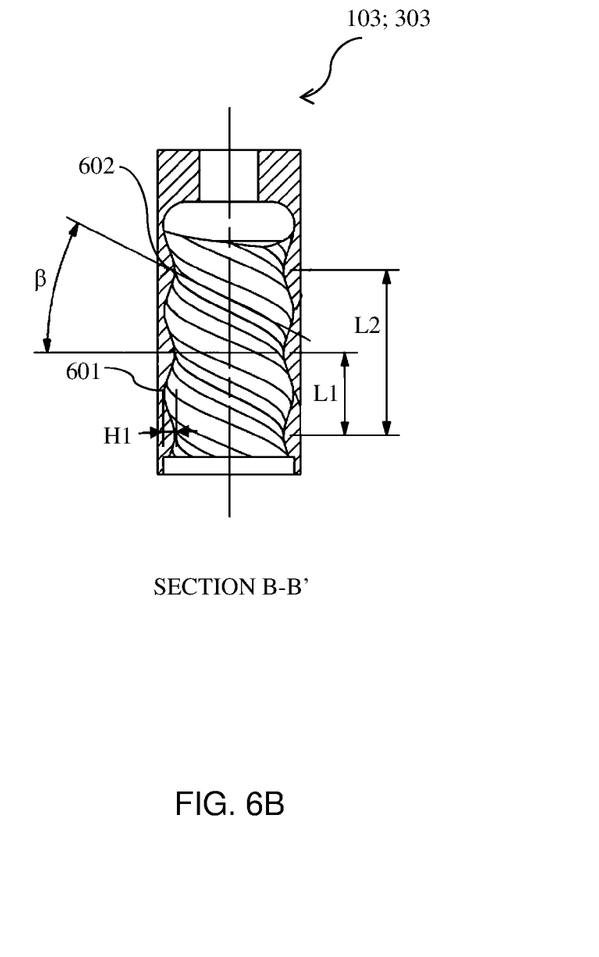
FIG. 6B is a cross sectional view B-B' of the female thread in FIG. 6B.
Figure 7:
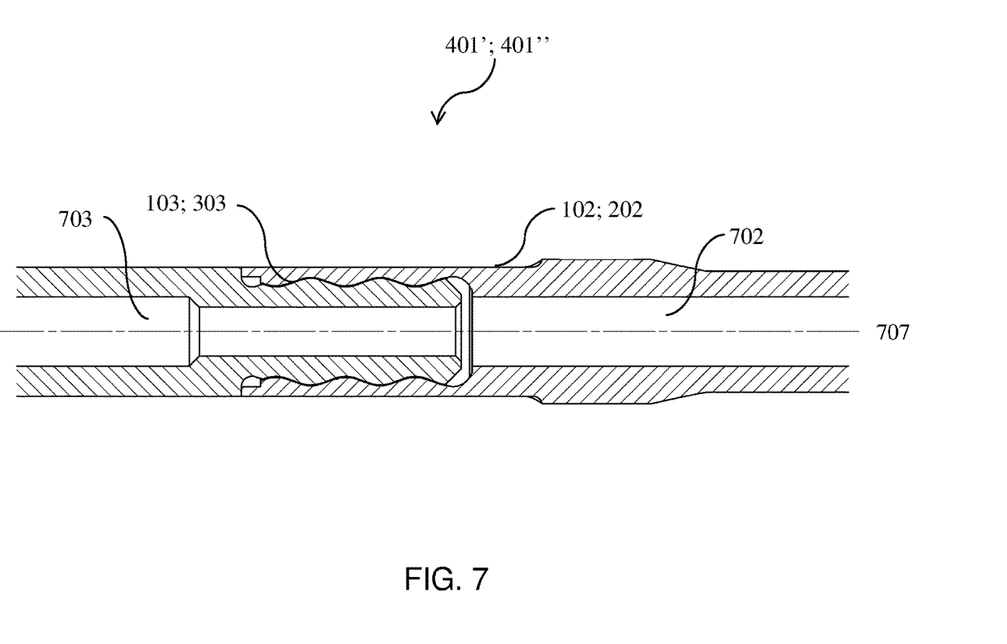
FIG. 7 is a cross sectional view of a threaded coupling in FIG. 4A-4B according to a specific implementation of the present invention.

The male threaded ends 102; 202 as shown in FIG. 5A-B and the female threaded ends 103; 303 as shown in FIG. 6A-B are connected to form the threaded couplings 401' and 401" as shown in FIG. 4A-4B. Referring to FIG. 7, a cross sectional view of a threaded couplings 401' and 401" according to a specific implementation of the present invention is shown. In this embodiment, the first axial length $L_M$ of the male ends 102; 202 and the second axial length $L_F$ of the female ends 103; 303 overlaps axially to form the threaded couplings 401' and 401". The axis of the male ends 102; 202, and the axis of the female ends 103; 303 coincides with each other to form an axis 707 of the threaded couplings 401' and 401", and a fluid passage for flushing is formed in the axial direction 707 by intercommunicating a hollow region 702 in the female ends 103; 303 and a hollow region 702 in the male ends 102; 202.

By using multi-start rope thread, setting the thread lead of the thread to be greater than the major diameter of the thread becomes possible, and thus, an increased lead angle can be provided to reduce the uncoupling torque of the threaded couplings.

The invention claimed is:
1. A drill string for rotary drilling with underground mining machines, the drill string comprising:
   a first elongate drill string member having a main section and a male end; and
   a second elongate drill string member having a main section and a female end, the male end and the female end each having respective threads arranged to provide a thread coupling between the male end and the female end, the thread coupling enabling the male end to be secured inside the female end such that the male end and the female end overlap axially, wherein a thread lead of the respective threads of the male end and the female end is greater than a diameter of the male end and a diameter of the female end, wherein the thread lead is a distance along an axis of the respective thread that is covered by one complete rotation of the thread, and wherein the respective threads of the male end and the female end are right-handed threads.
2. The drill string according to claim 1, wherein the respective threads of the male end and the female end are multi-start threads.

3. The drill string according to claim 2, wherein the respective threads of the male end and the female end are triple-start threads.

4. The drill string according to claim 2, wherein the respective threads of the male end and the female end each has a diameter in a range approximately between 16 mm and 25 mm, and a lead angle of the threads is greater than 17°.

5. The drill string according to claim 1, wherein the respective threads of the male end and the female end are double-start threads.

6. The drill string according to claim 1, wherein the respective threads of the male end and the female end are rope threads or trapezoidal threads.

7. The drill string according to claim 1, wherein the underground mining machine is a bolting machine or bolter miner.

8. A threaded coupling for connecting drill string members to form a drill string according to claim 1, wherein the threaded coupling comprises:
a male end having a first axial length;
a hollow female end having a second axial length, the male end and the female end each having respective threads to enable the male end to be secured inside the female end such that at least a part of the first axial length of the male end and a part of the second axial length of the female end overlap axially to form the threaded coupling.

9. The threaded coupling according to claim 8, wherein the respective threads of the male end and the female end each have a diameter in a range approximately between 18 mm and 25 mm, and a lead angle of the threads is greater than 17°.

10. The threaded coupling according to claim 8, wherein a diameter of the respective threads of the male end and the female end is approximately equal to 16 mm, and a lead angle of the threads is greater than 20°.

11. A rod adaptor for a rotary drilling machine, comprising:
a first end;
a second end, positioned towards a drill string according to claim 1, wherein the second end and a corresponding end of the drill string each have respective threads arranged to enable the rod adaptor to be secured to the drill string; and
an elongate body extending between the first end and the second end.

12. The rod adaptor according to claim 11, wherein the rod adaptor is a drive adaptor, the first end of the drive adaptor being positioned towards a drive system of the drilling machine, so that the drive system transmits power to the drive adaptor, and further to the drill string.

13. The rod adaptor according to claim 11, wherein the rod adaptor is a bit adaptor, the first end of the bit adaptor being positioned towards a drill bit of the drilling machine, so that power transmitted to the bit adaptor is further transmitted to the drill bit for drilling.

* * * * *